Sept. 14, 1926.
C. GIRL
AUTOMOBILE BUMPER
Filed Dec. 24, 1923  2 Sheets-Sheet 1
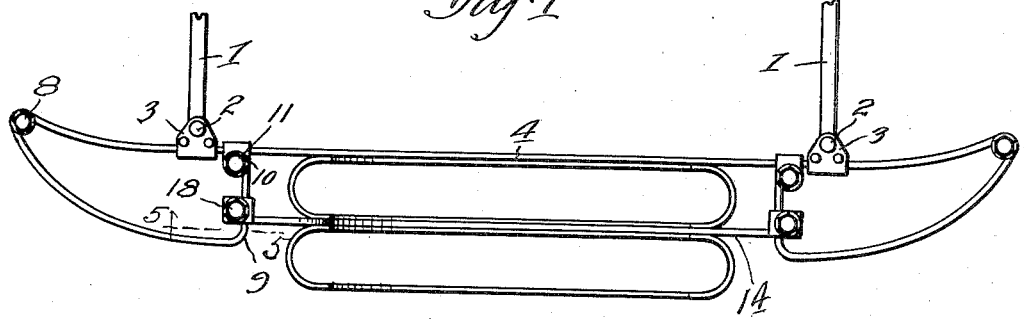
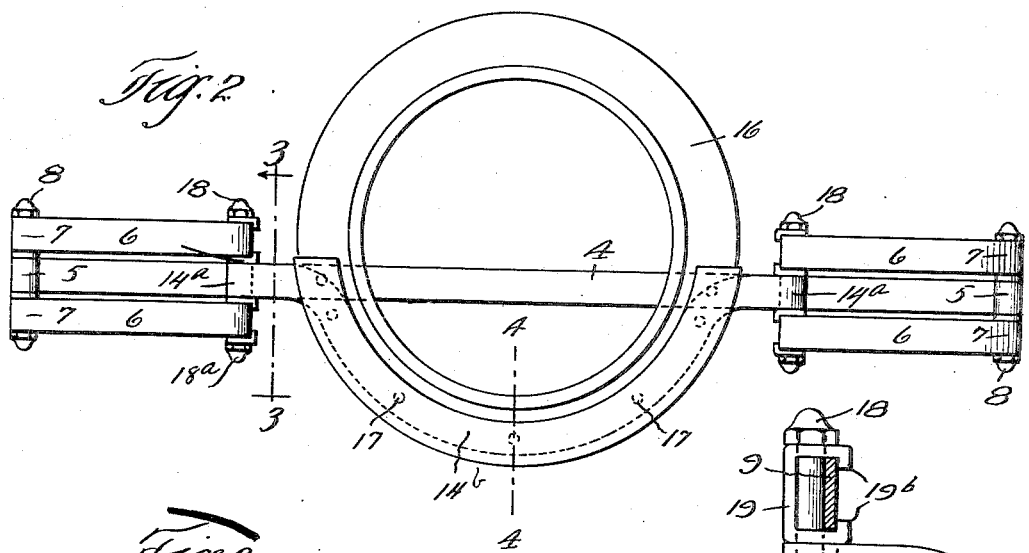
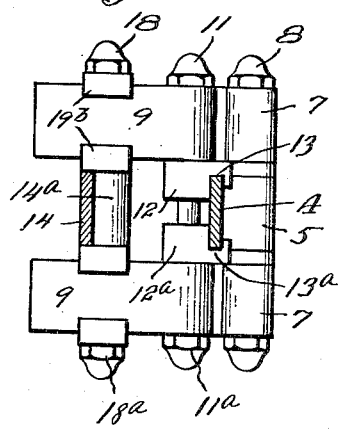
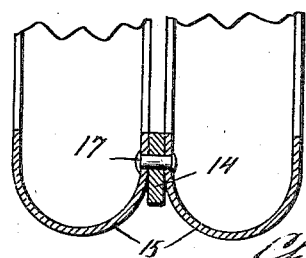
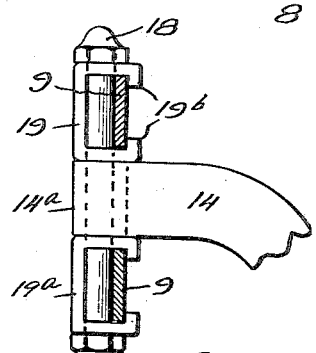
Inventor
Christian Girl,
By Hull, Buck & West
Attys Sept. 14, 1926.　　　　　　　　　　1,599,565
C. GIRL
AUTOMOBILE BUMPER
Filed Dec. 24, 1923　　　2 Sheets-Sheet 2
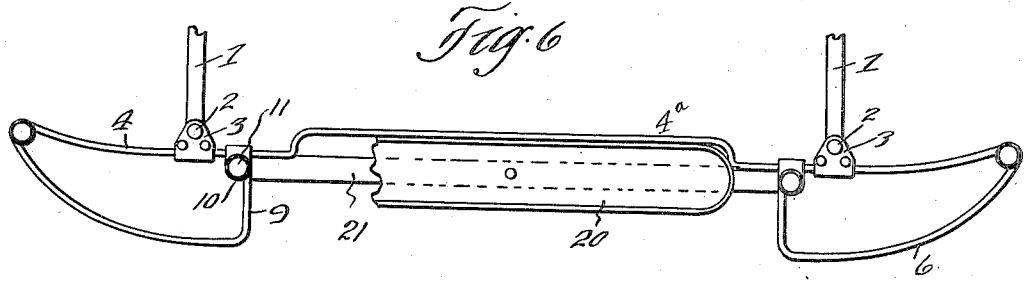
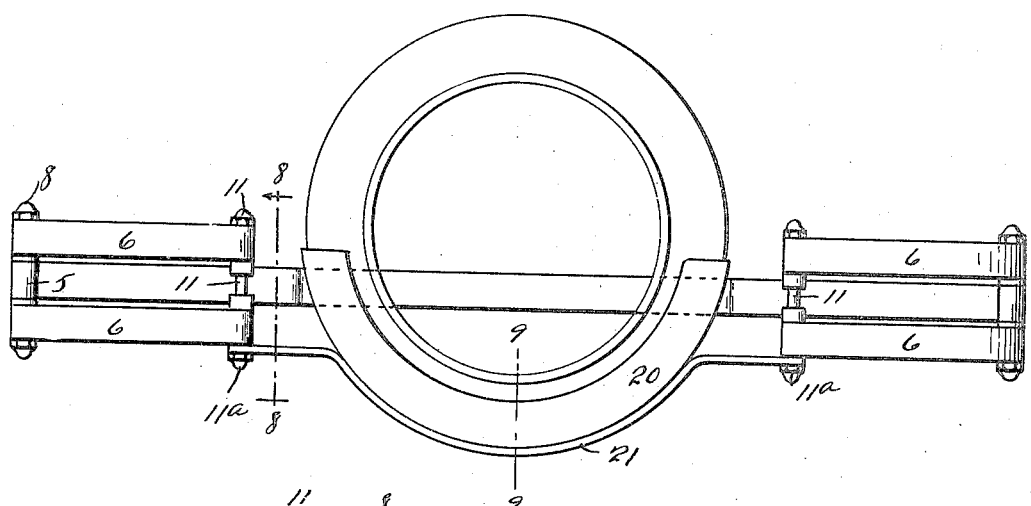
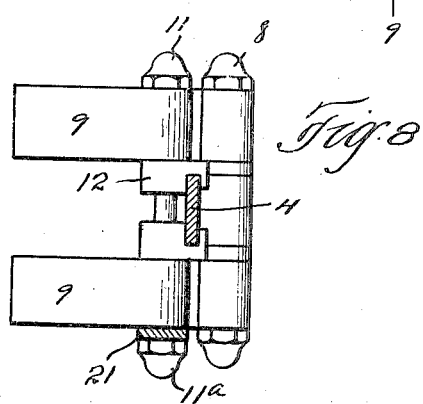

Patented Sept. 14, 1926.

1,599,565

UNITED STATES PATENT OFFICE.

CHRISTIAN GIRL, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed December 24, 1923. Serial No. 682,506.

This invention relates to bumpers for automobiles or similar vehicles, and more particularly to bumpers which are employed for the purpose of protecting the fenders at the rear of such vehicles. It is a general purpose and object of the invention to provide a bumper which will insure adequate protection for the fenders and which shall have combined therewith means for conveniently carrying a spare tire.

I secure the foregoing objects by means of the embodiments of my invention shown in the drawings forming a part hereof, wherein Fig. 1 represents a plan view and Fig. 2 a rear elevation of a bumper and tire carrier constructed in accordance with my invention; Fig. 3, a sectional detail corresponding to the line 3—3 of Fig. 2, omitting the supporting clamp and arm; Fig. 4 a sectional detail corresponding to the line 4—4 of Fig. 2; Fig. 5 a sectional detail corresponding to the line 5—5 of Fig. 1; Figs. 6 and 7 are views, similar to Figs. 1 and 2, respectively, showing a modification of my invention; and Figs. 8 and 9 are details in section corresponding respectively to the lines 8—8 and 9—9 of Fig. 7.

For convenience of description, the bumper will be assumed to be in the position which it occupies when applied to the rear of an automobile, and the terms "front" and "rear" will be used accordingly but without any intention of necessarily limiting the application of the bumper to any particular part of the vehicle.

Describing the various parts by reference characters, and first in connection with Figs. 1-5 inclusive, 1 represents bumper-supporting arms, of suitable construction, which arms are adapted for attachment to the side members (not shown) of an automobile. Each of these arms is shown as connected, by means of a vertical pivot bolt 2 and clamp 3, with the front or forwardly-positioned, bar 4 of a rear bumper. This bar is of sufficient length to extend across the rear of the vehicle and substantially across the rear fenders. The ends of the bar 4 are shown as curved forwardly or toward the vehicle and are provided each with an eye 5. At each end of the bar 4 are arranged upper and lower bars 6, 6, each having an eye 7 at one end thereof adapted to be connected to the corresponding eye 5 of the bar 4 by means of a bolt 8 extending through the aligned eyes, the eyes 5 being interposed between the eyes 7 on the ends of the bar 6.

The bars 6 project rearwardly with respect to the bar 4 and are then bent forwardly, or toward the bar 4, as indicated at 9, the extreme inner ends of the bars 6 being located above and below the bar 4, respectively, and each preferably terminating (adjacent to and at the rear end of the bar 4) with an eye 10. The eyes 10 are secured to the bar 4 by means of a bolt 11 extending through said eyes and through a pair of symmetrical clamping members 12, 12ª (see Fig. 3), the former member being adapted to engage the lower edge of the upper bar 6 and the latter the upper edge of the lower bar 6, each member having a recessed seat 13, 13ª, respectively adapted to engage the top and the bottom edge of the bar 4. It will be evident that, by setting up the nuts 11ª on the bolts 11, the parts 9 of the bars 6 will be forced toward each other, thereby forcing the clamping members 12, 12ª into close engagement with the top and bottom edges of the bar 4.

The bumper thus far described comprises a pair of end members or sections, each consisting of a part of the bar 4 and the cooperating bars 6; also an intermediate member or section, consisting of the part of the bar 4 between the opposed parts 9 of the bars 6.

14 denotes a bar having an eye 14ª at each end thereof and of such length as to extend across the space between the parts 9 and having its intermediate portion bent downwardly, as shown at 14ᵇ, to conform generally to the curvature of a tire carrier, indicated at 15. The carrier shown herein is of the double-carrier type, adapted to receive therewithin a pair of tires, one of which is indicated at 16. The tire carriers are arranged on each side of the bar 14 and are secured thereto, as by rivets 17. The bar 14 is conveniently secured in place by means of bolts 18, each extending through an eye 14ª thereof and through symmetrical C-shaped members 19 19ª, arranged respectively above and below the eye 14ª and provided each with flanges 19ᵇ, adapted to engage the edges of the parts 9 of the bar 6. The details of the clamping members 19, 19ª form no part of the invention covered hereby. By setting up the nuts 18ª on the lower ends of the bolts 18, the tire-carrier support 14 may be firmly secured to the parts 9.

In the modification shown in Figs. 6-8 inclusive, the parts 1, 2, 3, 5, 6, 7, 8, 9, 10, 11, 11ª, 12 and 12ª are identical with the correspondingly numbered parts in the preceding views. The front bar, however, is bent forwardly at 4ª, between the parts 9 thereby to provide a space for a tire carrier 20. The tire carrier is mounted upon a strap or bar, indicated generally at 21, having its ends supported from the bolts 11, by the nuts 11ª, the central portion of this strap or bar being bent downwardly to conform to the curvature of the tire carrier 20, the said carrier being supported in any convenient manner from the said strap or bar, as by means of rivets 22.

In both of the constructions shown and described herein, a very simple and efficient means is provided for supporting a tire carrier between the rearwardly projecting parts of my bumper; and this construction can be readily incorporated in a bumper of the type shown in the patent granted to myself and W. E. Dunston on December 4, 1923, No. 1,476,605. Furthermore, by the construction shown and described herein, the tire carrier-support forms in effect a part of the bumper and braces and strengthens the end portions thereof.

Having thus described my invention, what I claim is:—

1. The combination, with a bumper comprising a pair of end sections each adapted to overhang and protect a fender of a vehicle, of a tire-carrier support extending across the space between the said sections and supported directly thereby.

2. The combination, with a bumper comprising a pair of end sections each adapted to overhang and protect a fender of a vehicle, of a tire carrier support secured at its ends directly to such sections and having its central portion bowed downwardly therebetween.

3. The combination, with a bumper comprising a pair of end sections each adapted to overhang and protect a fender of a vehicle, of a tire carrier support secured at its ends directly to such sections and bowed downwardly therebetween to conform in curvature to and support such carrier.

4. The combination, with a bumper comprising a pair of end sections each adapted to overhang and protect a fender of a vehicle, each section comprising a pair of vertically spaced rearwardly projecting bars, of a tire-carrier support secured at its ends to and between the first mentioned bars and extending across the space therebetween.

5. The combination, with a bumper having a pair of end sections each adapted to overhang and protect a fender of a vehicle, said sections comprising each a pair of rearwardly projecting vertically spaced plates having their inner ends projecting forwardly, of a tire-carrier support having its ends interposed between the forwardly projecting portions of said bars and extending across the space therebetween.

6. The combination, with a bumper comprising a pair of end members each adapted to overhang and protect a fender of a vehicle and each comprising a pair of rearwardly bowed vertically spaced plates having their inner ends projecting forwardly, of a tire-carrier support having eyes at the opposite ends thereof adapted to be inserted between the forwardly extending portions of the bars of said members, and bolts extending through said eyes and connecting the same to such forwardly extending portions of said bars.

7. The combination, with a bumper comprising a front intermediate bar adapted to extend across the rear of a vehicle and overhang and protect the fenders thereof, and a pair of end members comprising each a pair of rearwardly bowed plates, the plates of each pair having each an inwardly extending portion adapted to be secured to the first mentioned bar, of a tire-carrier support, and bolts for securing the ends of said support to the said inwardly projecting portions of such bars.

In testimony whereof, I hereunto affix my signature.

CHRISTIAN GIRL.